United States Patent [19]
Narendran et al.

[11] Patent Number: 6,070,191
[45] Date of Patent: May 30, 2000

[54] DATA DISTRIBUTION TECHNIQUES FOR LOAD-BALANCED FAULT-TOLERANT WEB ACCESS

[75] Inventors: Balakrishnan Narendran, Jersey City; Sampath Rangarajan, Bridgewater; Shalini Yajnik, Scotch Plains, all of N.J.

[73] Assignee: Lucent Technologies Inc., Murray Hill, N.J.

[21] Appl. No.: 08/953,577

[22] Filed: Oct. 17, 1997

[51] Int. Cl.[7] .................................................. G06F 13/00
[52] U.S. Cl. .......................................... 709/226; 709/217
[58] Field of Search .................................... 709/201, 203, 709/217, 218, 219–227; 707/1, 10, 100, 200, 202

[56] References Cited

U.S. PATENT DOCUMENTS

| | | | |
|---|---|---|---|
| 5,371,852 | 12/1994 | Attanasio et al. | |
| 5,423,037 | 6/1995 | Hvasshovd | 707/202 |
| 5,644,720 | 7/1997 | Boll et al. | 395/227 |
| 5,774,660 | 6/1998 | Brendel et al. | |
| 5,933,606 | 8/1999 | Mayhew | 709/239 |

OTHER PUBLICATIONS

Serpanos et al., "MMPaching: A Load and Storage Balancing Algorithm for Distributed Multimedia Servers," Proc. of the IEEE Conference on Computer Design (ICCD'96), pp. 170–174, Oct. 1996.

Andresen et al., "SWEB: Towards a Scalable World Wide Web Server on Multicomputers," Dept. of Computer Science Tech. Report—TRCS95–17, U.C. Santa Barbara, Sep. 1995.

T.T. Kwan et al., "NCSA's World Wide Web Server: Design and Performance," IEEE Computer, pp. 68–74, Nov. 1995.

M. Garland et al., "Implementing Distributed Server Groups for the World Wide Web," Technical Report CMU–CS–95–114, School of Computer Science, Carnegie Mellon University, Jan. 1995.

O.P. Damani et al., "ONE–IP: Techniques for Hosting a Service on a Cluster of Machines," Sixth International World Wide Web Conference, Santa Clara, Apr. 1997.

D. Dias et al., "A Scalable and Highly Available Server," Compcon '96, pp. 85–92, 1996.

(List continued on next page.)

*Primary Examiner*—Zarni Maung

[57] ABSTRACT

A server system for processing client requests received over a communication network includes a cluster of N document servers and at least one redirection server. The redirection server receives a client request from the network and redirects it to one of the document servers, based on a set of pre-computed redirection probabilities. Each of the document servers may be an HTTP server that manages a set of documents locally and can service client requests only for the locally-available documents. A set of documents are distributed across the document servers in accordance with a load distribution algorithm which may utilize the access rates of the documents as a metric for distributing the documents across the servers and determining the redirection probabilities. The load distribution algorithm attempts to equalize the sum of the access rates of all the documents stored at a given document server across all of the document servers. In the event of a server failure, the redirection probabilities may be recomputed such that the load of client requests is approximately balanced among the remaining document servers. The redirection probabilities may also be recomputed periodically in order to take into account changes in document access rates and changes in server capacity. The recomputation may be based on a maximum-flow minimum-cost solution of a network flow problem.

57 Claims, 5 Drawing Sheets

OTHER PUBLICATIONS

J. Gwertzman et al., "The Case for Geographical Push–Caching," HotOS '95, 1995.

A. Bestavaros, "Speculative Data Dissemination and Service to Reduce Server Load, Network Traffic and Service Time in Distributed Information Systems," Proceedings of the International Conference on Data Engineering, Mar. 1996.

A. Heddaya et al., "Web Wave: Globally Load Balanced Fully Distributed Caching of Hot Published Documents," Computer Science Technical Report, BU–CS–96–024, Boston University, Oct. 1996.

"Hypertext Transfer Protocol—HTTP/1.0," Network Working Group, May 1996.

T.D.C. Little et al., "Popularity–Based Assignment of Movies to Storage Devices in a Video–on–Demand System," ACM/Springer Multimedia Systems, pp. 1–20, 1994.

M.E. Crovella et al., "Dynamic Server Selection in the Internet," Proc. of the Third IEEE Workshop on the Architecture and Implementation of High Performance Communication Subsystems, HPCS'95, pp. 1–5, 1995.

C. Yoshikawa et al., "Using Smart Clients to Build Scalable Services," in Proceedings of the USENIX 1997 Annual Technical Conference, CA, Jan., 1997.

J. Gwertzman, "Autonomous Replication in Wide–Area Internetworks," Center for Research in Computing Technology, Harvard University, MA, pp. 1–100, Apr. 1995.

IBM Interactive Network Dispatcher (IND), http://www.ics.raleigh.ibm.com/netdispatch, "Interactive Network Dispatcher Version 1.1 for Sun Solaris and Microsoft Windows," "NT Join Interactive Session Support for AIX," and "Interactive Session Support for AIX Manages Interactive Load Distribution Across AIX Clusters," 6 pp., 1997.

DATA DISTRIBUTION TECHNIQUES FOR LOAD-BALANCED FAULT-TOLERANT WEB ACCESS

FIELD OF THE INVENTION

The present invention relates generally to server systems for use in processing client requests received over communication networks such as the Internet and more particularly to server-side techniques for processing client requests in a server system.

BACKGROUND OF THE INVENTION

Many server-side techniques have been proposed to increase the throughput and scalability of web servers and to decrease the request latency for clients. In an exemplary server-side technique described in M. T. Kwan et al, "NCSA's World Wide Web Server: Design and Performance," IEEE Computer, pp. 68–74, November 1995, independent web servers use a distributed file system known as Andrew File System (AFS) to access documents requested by the clients. A round robin Domain Name Service (DNS) is used to multiplex requests to the web servers. In this server system architecture, although the throughput is increased by balancing the load across the servers through multiplexing, a high degree of load balance may not be achieved due to DNS name caching at different places in the network. This DNS name caching will also prevent the clients from tolerating server failures.

Another approach that uses AFS is described in M. Garland et. al., "Implementing Distributed Server Groups for the World Wide Web," Technical Report CMU-CS-95-114, School of Computer Science, Carnegie Mellon University, January 1995. In this approach, a front-end server, called a dispatcher, is used to dispatch a request to one of a number of back-end document servers. The dispatcher monitors the load on the document servers and based on this information determines which server should service a given incoming client request. The document servers have access to all the requested documents by using the AFS. Unfortunately, these and other approaches based on AFS are limited by the need for the web servers either to go across the network through the file servers to fetch the document, as in the NCSA server, or to store all the documents locally.

The SWEB approach described in D. Andresen et al., "SWEB: Towards a Scalable World Wide Web Server on Multicomputers," Department of Computer Science Tech Report—TRCS95-17, U.C. Santa Barbara, September, 1995, uses distributed memory machines and a network of workstations as web servers. All the servers do not locally store all the documents, but can instead go over a LAN to fetch documents that are requested but are not locally available. At the front end, a round robin DNS is used to direct a request to one of the web servers. This web server then uses a pre-processing step to determine whether the request should be serviced locally or should be redirected to another server. The redirection decision is made based on a dynamic scheduling policy that considers parameters such as CPU load, network latency and disk load. If a decision is made to service a request locally, and if the document is not available locally, an appropriate server is chosen from which the document is fetched. If a decision is made not to service the request locally, another server is chosen and the client is redirected to that server using HTTP redirection. This system is scalable and does not require each server to locally store all documents. Although this system alleviates the problem of DNS name caching through the use of server redirection, the increase in throughput is still limited by the dynamic redirection and the need to go over the network to fetch documents. Furthermore, failures are still a problem due to the use of DNS name caching.

The "One-IP" approach described in O. P. Damani, P.-Y. Chung, Y. Huang, C. Kintala, Y.-M. Wang, "ONE-IP: Techniques for Hosting a Service on a Cluster of Machines," Sixth International World Wide Web Conference, Santa Clara, April 1997, and U.S. patent application Ser. No. 08/818,989 filed Mar. 14, 1997, distributes requests to different servers in a cluster by dispatching packets at the Internet Protocol (IP) level. A dispatcher redirects requests to the different servers based on the source IP address of the client. The One-IP approach provides a low-overhead scalable solution, but a potential drawback is that the load may not be optimally balanced if arriving requests do not have source IP addresses that are reasonably random.

An approach referred to as "TCPRouter" is described in D. Dias et al., "A Scalable and Highly Available Server," COMPCON '96, pp. 85–92, 1996. This approach publicizes the address of the server side router which receives the client requests, and dispatches the request to an appropriate server based on load information. The destination address of each IP address is changed by the router before dispatching. This means that the kernel code of every server in the cluster needs to be modified, although the approach can provide fault-tolerance and load balancing in certain applications.

A number of other server-side techniques are based on caching or mirroring documents on geographically distributed sites. See, for example, J. Gwertzman and M. Seltzer, "The Case for Geographical Push-Caching," HotOS '95, 1995, A. Bestavaros, "Speculative Data Dissemination and Service to Reduce Server Load, Network Traffic and Service Time in Distributed Information Systems," Proceedings of the International Conference on Data Engineering, March 1996, and A. Heddaya and S. Mirdad, "WebWave: Globally Load Balanced Fully Distributed Caching of Hot Published Documents," Computer Science Technical Report, BU-CS-96-024, Boston University, October 1996. These techniques are generally referred to as geographic push caching or server side caching. Client requests are sent to a home server which then redirects the request to a proxy server closer to the client. The redirection can be based on both geographic proximity and the load on the proxies. Dissemination of document information from the home server is used to keep the caches consistent. These techniques are limited in their scalability because of the need for keeping caches consistent. Furthermore, the load balancing achieved may be limited if the location information of the document is cached at the client. Fault-tolerance is also an issue as it will be difficult for the home server to keep dynamic information about servers that are faulty.

SUMMARY OF THE INVENTION

The invention provides improved server-side techniques for processing client requests received over the Internet and other communication networks, without the problems associated with the above-described conventional approaches. An illustrative embodiment is a scalable and fault-tolerant web server system which utilizes HTTP redirection. The system includes of a set of N document servers and one or more redirection servers which receive HTTP requests from clients and redirect the requests to the document servers in accordance with pre-computed redirection probabilities. A load distribution algorithm is used for initial distribution of a set of documents across the servers and determination of the redirection probabilities. Given a specific degree of document replication k, the load distribution algorithm ensures that at least k replicas of each document are present after document distribution is complete. The algorithm can also ensure that for all the documents combined no more than N−1 redundant replicas will exist in the system. The redirection servers redirect requests to one of the replicas with the corresponding redirection probability. The load distribution algorithm together with this redirection mechanism ensures that the load is properly balanced across the N document servers.

In embodiments which utilize replicated copies of documents, the redirection probabilities may be recomputed periodically using an algorithm based on network flow. For example, if a given document server fails, the redirection server can use recomputed redirection probabilities to ensure that the load can be approximately balanced among the remaining servers without any need for moving documents among them. This allows for graceful degradation of service in the event of server failure. The redirection probabilities may also be recomputed in the event of other changes affecting the server system, including changes in document access probabilities and changes in server capacities.

DETAILED DESCRIPTION OF THE INVENTION

The present invention will be illustrated below in conjunction with exemplary client/server connections established over the Internet using the Transmission Control Protocol/Internet Protocol (TCP/IP) standard. It should be understood, however, that the invention is not limited to use with any particular type of network or network communication protocol. The disclosed techniques are suitable for use with a wide variety of other networks and protocols. The term "web" as used herein is intended to include the World Wide Web, other portions of the Internet, or other types of communication networks. The term "client request" refers to any communication from a client which includes a request for information from a server. A given request may include multiple packets or only a single packet, depending on the nature of the request. The term "document" as used herein is intended to include web pages, portions of web pages, computer files, or any other type of data including audio, video and image data.

Figure 1:
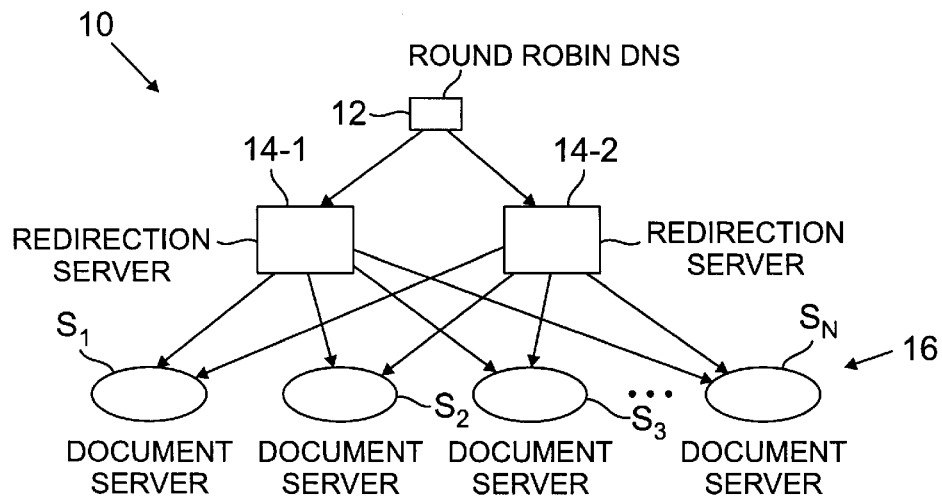
FIG. 1 is a block diagram illustrating an exemplary scalable and fault-tolerant web server system in accordance with the invention.

FIG. 1 shows an exemplary web server system 10 in accordance with an illustrative embodiment of the invention. The server system 10 includes a round-robin domain name service (DNS) server 12, a pair of redirection servers 14-1 and 14-2, and a cluster 16 of N document servers $S_1, S_2, \ldots S_N$ interconnected as shown. The server system 10 communicates with one or more clients over TCP/IP connections established over a network in a conventional manner. Each of the elements of server system 10 may include a processor and a memory. The system 10 is suitable for implementing Hypertext Transfer Protocol (HTTP)-based network services on the Internet. The HTTP protocol is described in greater detail in "Hypertext Transfer Protocol—HTTP/1.0," Network Working Group, May 1996, <http://www.ics.uci.edu/pub/ietf/http>, which is incorporated by reference herein. For example, a client may generate an HTTP request for a particular service hosted by the server system 10, such as a request for information associated with a particular web site, and a TCP/IP connection is then established between the client and a particular one of the document servers 16 in the server system 10. The requested network service may be designated by a uniform resource locator (URL) which includes a domain name identifying the server system 10 or a particular one of the document servers 16 hosting the service. The DNS server 12 maps a domain name in a client request to an IP address of the appropriate server in the system 10.

Each of the document servers 16 in the illustrative embodiment of FIG. 1 may be an HTTP server that manages a set of documents locally and can service client requests only for the locally-available documents. The redirection servers 14-1 or 14-2 redirect a request to a document server only if a copy of the document is available at that server. Thus, the document servers 16 are independent and need not incur the overhead required to collaborate and retrieve a document over a local area network, as in conventional approaches such as the SWEB system described previously. Also, because each document server $S_i$ serves only a subset of the available documents, the document server cache will be utilized more efficiently than in a system in which each document server is capable of serving all documents. As will be described in greater detail below, the server system 10 makes use of a document distribution algorithm and a redirection mechanism to balance the request load across the document servers 16 and to also provide for fault-tolerance and graceful degradation of performance through replication. It should be noted that alternative embodiments of the invention may be configured such that the documents served by a given document server are not available locally on that server. For example, the subset of the available documents served by the given server may be retrieved from a file server accessible over a local area network.

The round-robin DNS 12 of server system 10 multiplexes client requests among the redirection servers 14-1, 14-2 such that a single redirection server does not become a bottleneck. Other types of DNS techniques may also be used. The redirection servers 14-1, 14-2 redirect the incoming client requests to a document server $S_i$ that maintains the requested document. Since the documents are permitted to be replicated, more than one document server $S_i$ may be a candidate for servicing the client request. The redirection servers 14-1, 14-2 use a redirection mechanism to be described below in order to determine which document server $S_i$ should service a particular request. The redirection mechanism may be based on the HTTP protocol and thus can be supported by most currently available browsers and servers. The redirection mechanism may use the access rates of the documents as a metric for partitioning the documents across the document servers. In one possible implementation, it attempts to equalize the sum of the access rates of all the documents stored at a given document server across all document servers. It should be noted that this redirection mechanism could be implemented at a higher level of granularity, in which directories are distributed instead of documents, and access rates of these directories are balanced across a set of servers. As noted above, the term "document" is intended to include without limitation any type of data that may be distributed across multiple servers in a server system.

As noted above, an illustrative embodiment of the invention utilizes access rate as a metric to balance load in a server system. The access rate metric is particularly well-suited for applications in which the document servers are dedicated to providing web service. In such a system, balancing the load based on conventional metrics such as central processing unit (CPU) queue length, disk usage and the like may not provide adequate load balancing. Given that each of the document servers can generally support a limited number of TCP connections, in a server system where a large number of HTTP requests are expected, it is generally more appropriate to have as a metric, the minimization of the probability that a request fails because the corresponding document server is at its peak TCP connection load. For example, assume that l is the maximum number of TCP connections that a document server can support. If $\lambda$ is the rate at which HTTP requests come into the redirection server(s), the documents should be distributed across the N back-end document servers such that the rate of request redirected to each server is approximately $\lambda/N$.

In general, the document distribution problem can be characterized as follows: Given a set of M documents with access rates $r_1, r_2, \ldots, r_M$ (total access rate $r=r_1+r_2+\ldots r_M$) and N servers $S_1, S_2, \ldots, S_N$ which can support a maximum number of simultaneous HTTP connections $l_1, l_2, \ldots, l_N$, respectively (total maximum number of connections $l=l_1+l_2+\ldots l_N$), and the requirement that each document be replicated on at least k document servers, distribute the documents on the servers such that $R_i=r\times l_i/l$ where $R_i$ is sum of the access rate of all documents on document server i. Thus, the documents are distributed such that the load on each server is proportional to its capacity in terms of the maximum number of HTTP connections that it can support simultaneously. If $l_1=l_2=\ldots l_N$, all the document servers in the cluster have the same capacity and such a cluster is referred to as homogeneous, as opposed to a heterogeneous cluster where the server capacities are non-uniform. In the homogeneous cluster case, the blocking probability is minimized if the access rates are made equal across all servers, assuming that the average document size on a server is the same across all the servers. If the document sizes are varied, then the average connection time per request will be different among requests and hence the length of the documents may be taken into account by defining the "access rate" to a document i as $r_i=S_i*\delta_i$ where $S_i$ is the size of the document and $\delta_i$ is the rate of request to the document.

An algorithm to be described below, referred to as the "binning" algorithm, may be used to provide an initial document distribution that achieves load balance in a heterogeneous server cluster with a value of k=1. This algorithm may also be used as a basis for algorithms for values of k>1. In order to balance the access rates, the binning algorithm may create more than k replicas of a given document. However, it will be shown that the total number of redundant replicas that the algorithm creates over all documents can always be made less than or equal to N−1. The binning algorithm can be extended to the case of k>1 by distributing an extra k−1 "dummy" replicas of each document across the documents servers. However, HTTP requests only go to replicas which were created initially, and no requests are actually serviced by the dummy replicas.

Let the access rate of the k replicas of document j be denoted by $r_j^1, r_j^2, \ldots, r_j^k$. Then for each document, only one of its replicas, referred to as the master replica, will service all requests; i.e., $r_j^1=r_j$ and $r_j^2=\ldots=r_j^k=0$. For the case of a homogeneous server cluster, the invention provides a two-phase algorithm which uses the binning algorithm in one of its phases to distribute the documents such that local balance on replicas of each document is obtained, i.e., the access rates of the replicas are made equal. It is believed that this property enables graceful degradation of performance and load in the event of failures. Similar to the binning algorithm, the two-phase algorithm may lead to the possibility that redundant replicas are distributed. It can be shown that the number of redundant replicas for all of the documents combined can be no more than N−1, which implies that at most N−1 documents may have more than k replicas in the system. The initial distribution algorithms are complemented by the redirection mechanism at the redirection server to achieve load balance.

As noted above, for a heterogeneous server cluster, requests for a document may be redirected by the redirection server to only one replica and for a homogeneous cluster requests may be redirected such that the replicas of the documents have equal access rates. This means that, for each document, the redirection server needs to maintain information about the location of the replicas and then redirect a request to the relevant replica based on the probabilities determined by the initial distribution algorithm to be described below. In embodiments including multiple redirection servers, the redirection servers may each maintain the same probability information for load balance across the document servers, assuming that the round robin DNS 12 balances the load across the redirection servers.

The server system 10 of FIG. 1 can be configured to provide graceful performance degradation in the presence of document server failures with minimum reconfiguration of the system. For example, in embodiments in which documents are replicated and therefore available on more than one server, the redirection mechanism noted above can be used to configure the server system such that the initial distribution of the documents need not be changed and no document movement is required. When a given document server fails, a network flow based algorithm may be used to recompute the redirection probabilities to each of the replicas of each of the documents in order to approximately rebalance the load across the remaining document servers. It should be noted that the server cluster may have some of the documents replicated less than k times, because the illustrative system is not configured to generate and place new copies of documents that were on a failed server. Furthermore, the above-noted properties that only one replica will receive all requests for a document (in a heterogeneous cluster) or that replicas of a document have equal access rates (in a homogeneous cluster) will no longer hold true in the event of server failure. However, once the failed server is repaired, the initial redirection probabilities can be reinstated.

The operation of server system 10 will first be described for the case of a heterogeneous cluster with the requirement that at least one copy of each document (i.e., k=1) is available in some document server $S_i$ in the cluster 16. As described earlier, the cumulative access rate of document server $S_i$, should be $R_i=r\times l_i/l$ after document distribution. The binning algorithm operates as follows. A random document server $S_i$, is picked and a random document j is picked and placed on that server. After the access rate of the document is mapped to the document server, if there is still some residual capacity left in the server, i.e., its maximum access rate $(r\times l_i/l)$ is not reached, then another document k is randomly picked and is placed on this server. This process continues until the total access rate to the document server $S_i$ upon the placement of a document m exceeds the maximum access rate $(r\times l_i/l)$. At this stage, another document server is randomly picked and document m is replicated on that server. The portion of access rate δ of document m that could not be mapped to server $S_i$ is mapped onto this other server. Thus, if each of the document servers are considered to be a bin with a certain capacity, then the binning algorithm fills each bin completely before another bin is chosen to be filled. An exemplary set of pseudo-code for the above-described binning algorithm is shown below.

```
Let U = {1,2, . . . , M} be a set of documents and
S = S₁,S₂, . . . S_N the set of servers.
Let R_i and l_i be the cumulative access rate and capacity of S_i respectively.
Let r_i be the total access rate to document i.
Randomly choose j in set U;
δ =r_j;
while S is not empty {
        Randomly choose S_i in set S;
        R_i = 0;
pic_doc: If (δ == 0) then {
                Randomly choose j in set U;
                Place j on S_i;
                δ = r_j;
        }
        Else
        Place j on S_i;
        If(R_i + δ > r × l_i/l) then {
                δ = δ - (r × l_i/l-R_i);
                R_i = r × l_i/l;
                S = S - {S_i};
        }
        Else if (R_i + δ == r × l_i/l) then {
                R_i = r × l_i/l;
                δ = 0;
                S = S - {S_i};
                U = U - {j};
        }
        Else if (R_i + δ < r × l_i/l) then {
                R_i = R_i + δ;
                δ = 0;
                U = U - {j};
                go to pic_doc;
        }
}end while
```

In the above-described binning algorithm, when a document is placed on a document server $S_j$, either the entire access rate of the document can be completely mapped onto that server without exceeding the server's capacity, or the server's cumulative access rate will exceed the capacity, in which case the document copy is replicated on the next document server. Intuitively, the placement of a document on a server can either exhaust the document access rate or exhaust the server. A document is replicated only when a server is exhausted without being able to accept the access rate of that document completely. Each server can be exhausted only once and each exhaustion does not necessarily result in production of a replica. Therefore, in a system with N document servers, there can be at most N replications. However, when the last document server is exhausted, all the access rate of the document which is currently being mapped to it gets used up, since the sum of the capacities of the servers equals the sum of the access rates r of all documents in this embodiment. Exhaustion of the last server therefore does not produce a replica, such that the maximum number of replications is reduced from N to N−1.

In the case of a heterogeneous cluster with the requirement that more than one copy of each document (i.e., k>1) is available in some document server $S_i$ in the cluster 16, the above-described binning algorithm can be first used to place at least one copy of each document on some document server in the cluster in order to achieve load balancing for the single copies, and then used to distribute k−1 replicas of each of the documents randomly onto the document servers without directing any load to them. These replicas are the above-noted "dummy" replicas that are used only in the event of a document server failure. When failures occur, these replicas may be made "active" in order to rebalance the load, as will be described in greater detail below.

A homogeneous server cluster is a special case of the heterogeneous cluster and can use the above-described binning algorithm to achieve a balanced load. However, the binning algorithm generally does not achieve local balance as defined previously. An exemplary two-phase algorithm that achieves local balance for homogeneous clusters will be described below. This two-phase algorithm uses the binning algorithm in its second phase.

Let the access rate of document i be $r_i$ and the total access rate of the M documents be $r=r_1+r_2+ \ldots r_M$. Consider k replicas of document j. The k replicas are referred to as "copies" of the document; the copies may also be replicated and will be referred to as "replicated copies." Let the access rate of copy j of document i be $r_j^i$. Assume the access rate $r_j$ of document j is divided equally among its copies. Arrange the document copies in ascending order according to their access rates. Assume without loss of generality that $r_1^1=r_1^2= \ldots r_1^k \leq r_2^1=r_2^2= \ldots =r_2^k \ldots \leq r_M^1=r_M^2= \ldots =r_M^k$, where $r_1^1=r_1^2= \ldots =r_1^k=r_{1/k}$, $r_2^1=r_2^2= \ldots =r_2^k=r_{2/k}$, and so on. The goal of the two-phase algorithm is to distribute these documents such that after distribution, $R_1=R_2= \ldots R_N=r/N$. The with copy of thejth document is denoted by $j^i$. The pseudo-code for the two-phase algorithm is shown below. It should be noted that the two-phase algorithm could be modified in a straightforward manner to allow for different documents to have different replication requirements, i.e., k could be different for different documents. For simplicity of illustration, the description will assume that k is the same for all documents.

```
Let U be the set of documents replicated and arranged as described above.
Let S be the set of servers where the servers are randomly ordered as S = S₁,S₂, . . . S_N.
Let CP_i^d be the cumulative access rate of server S_i after d documents have been placed on it.
Phase 1:
d=1;
for all i from 1 to N set CP_i^0 = 0;
Start: In round d {
    Place the next N document copies from U in order on the N servers
    in S and while placing a document j^i on S_e, do the following: {
        If (CP_e^(d-1) + r_j^i < r/N) then {
            Place document j^i on S_e;
            U = U - {j^i};
            CP_e^d = CP_e^(d-1) + r_j^i;
        Else
            CP_e^d = r/N;
            δ = r_j^i - (r/N - CP_e^(d-1));
            D = d;
            exit Phase 1;
        }
    }
    d = d + 1;
    go to Start;
}
End of Phase 1.
Phase 2:
Order the servers in the order S = {S_(e+1),S_(e+2), . . . , S₁,S₂, . . . S_(e-1)};
while S is not empty {
    Choose the next server S_i in set S;
    R_i =CP_i^D;
pic_doc: If (δ == 0) then {
            Choose next document k starting from j^(i+1) in the same order as
            in Phase 1;
```

-continued

```
        Place this document on S_i;
        δ = r_k = r_j^{i+1};
    }
    Else
        place r_j^i on S_i;
        If (R_i + δ > r × l_i/l) then {
            δ = δ - (r × l_i/l - R_i);
            R_i = r × l_i/l;
            S = S - {S_i};
        }
        Else if (R_i + δ = r × l_i/l) then {
            R_i = r × l_i/l;
            δ = 0;
            S = S - {S_i};
            U = U - {k};
        }
        Else if (R_i + δ < r × l_i/l) then
            R_i = R_i + δ;
            δ = 0;
            U = U - {k};
            go to pic_doc;
        }
end while
End of Phase 2.
```

In the first phase of the two-phase algorithm shown above, a round-robin technique is used. This phase of the algorithm consists of a number of rounds. In the first round, the first N document copies are placed on the first N document servers; in the second round, the next N document copies are placed on the N document servers, and so on. Each time a document is placed on a document server, the cumulative access rate of all the documents on the servers is calculated. After d documents have been placed on a server (i.e., after d rounds), the cumulative access rate of document server $S_i$ is $CP_i^d$. Given that the documents are placed in ascending order of their access rates, $CP_1^d \leq CP_2^d \ldots \leq CP_N^d \leq CP_i^{d+} \leq \ldots$, the first time the access rate of a server $S_i$ exceeds the maximum allowed for that server (r/N), the first phase ends. Assume that this happens at round D. Let the server where this happened be $S_e$ and the document copy which made this happen be $j_i$. Assume that the access rate of $j_i$ that could not be directed to $S_e$, without the cumulative access rate of the server exceeding r/N, be δ. Thus, at the end of the first phase, $CP_1^D \leq CP_2^D \ldots \leq (CP_e^D = r/N) > CP_{e+1}^{D-1} \leq \ldots CP_N^{D-1} \leq CP_i^D$. At the end of the first phase, only server $S_e$ has reached its maximum cumulative access rate and the cumulative access rates of all the servers are in circularly ascending order starting from server $S_{e+1}$. Document copies $j^i, j^{i+1}, \ldots, j^k, \ldots, M^1, M^2, \ldots, M^k$ still need to be distributed. In the round-robin scheme, replication of a given document copy takes place only if a server exceeds its capacity when this document copy is placed on that server. Since the first phase ends when any server exceeds its access rate, there is no replication of document copies during this phase.

In the second phase of the two-phase algorithm, the remaining document copies are distributed using the binning algorithm on the residual capacities of the servers. Document copies are placed on a server until a cumulative access rate of r/N (i.e., the maximum allowed access rate) is reached before being placed on the next server. Thus, document copy $j^i$ is replicated on $S_{e+1}$ and its remaining access rate δ is mapped to this server. If the cumulative access rate of $S_{e+1}$ exceeds r/N because of this mapping, then $j^i$ is replicated on $S_{e+2}$ and the remaining access rate is mapped to this server, and so on. Since the binning algorithm is used in the second phase, it follows from the above description of the algorithm that when a document copy is placed on a server, either all its access rate can be completely mapped onto that server without the cumulative access rate of the server exceeding r/N, or the cumulative access rate will exceed r/N, in which case the document copy is replicated on the next server. Again, this means that placement of a document copy on a server in the second phase either exhausts the access rate of the document copy or exhausts the server. Following arguments from the discussion of the binning algorithm, not more than N−1 "redundant" replicas of document copies will be placed during the second phase; this together with the fact that there is no replication of document copies during the first phase means that at most N−1 documents will have more than k replicas placed on the servers in the cluster. It is possible that two copies of the same document may be placed on the same server in which case these copies will be merged to form a single copy. It will be shown below that after distribution at least k copies of a document will be available in the server cluster.

The second phase of the algorithm starts only when some document server exceeds its capacity and because of the cyclical ascending nature in the way servers are exhausted, it can be seen that not more than one document copy can be completely exhausted in a given server in this phase. That is, two document copies cannot be completely exhausted in a given server, which implies that at least one of them will be replicated in another server. As a result, even if two document copies are merged together, one of them will regenerate another copy on another server and hence the goal of distributing at least k document copies will still be satisfied. At the end of the second phase, each server will have a cumulative document access rate of exactly r/N in this embodiment. A number of examples will be provided below to illustrate the above-described distribution algorithms and redirection mechanism.

Figure 2:
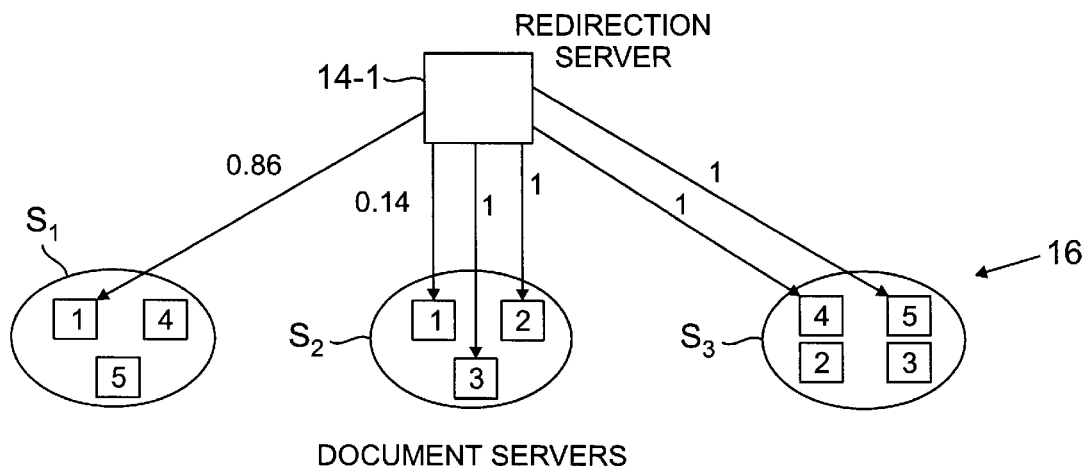
FIG. 2 illustrates the operation of a portion of the web server system of FIG. 1 as applied to an exemplary set of documents and client requests.

FIG. 2 shows a first example of a server system including a single redirection server 14-1 and a heterogeneous server cluster 16 with three document servers $S_1$, $S_2$, $S_3$ and five documents designated 1, 2, . . . , 5 distributed across the five documents servers as shown. Assume that the access probabilities of the five documents 1, 2, . . . , 5 are 0.35, 0.5, 0.05, 0.04 and 0.06, respectively. The access probability in this example is the probability that when an HTTP request arrives at the redirection server 14-1, it is a request for the corresponding document. The access probabilities can be obtained by scaling the access rates. Each document is replicated once (i.e., k=1). Also assume that the scaled capacities ($l_i/l$) of the document servers $S_1$, $S_2$, $S_3$ are 0.3, 0.6 and 0.1, respectively This is the target load that should be reached on each server in order to achieve load balance. The binning algorithm chooses documents and servers at random. For this example, assume that the documents are picked in the order 1 through 5 and the servers are also picked in numerical order. First, document 1 is placed on $S_1$. The capacity of $S_1$ (0.3) is exceeded and hence 1 is replicated on $S_2$ and the residual access probability of 0.05 is mapped to that server. Now, document 2 is placed on $S_2$ and is exhausted. Next, document 3 is placed on $S_2$ and with this placement, both $S_2$ and document 3 are exhausted. Then, both documents 4 and 5 are placed on $S_3$ thereby exhausting both the documents and the server. This distribution leads to only document 1 having more than one copy. Hence, there is only one redundant replication. Note that the theoretical upper limit for the number of redundant copies in the system is N−1=2.

If the example is altered such that k>1, then the extra replicas that are required can be distributed as dummy replicas randomly on the document servers, without repeating a document copy on a server where it already exists. These dummy replicas have zero access probabilities. Instead of random distribution, the dummy replicas could also be distributed to balance other parameters such as space. For example, if k=2, then dummy replicas of documents 2, 3, 4 and 5 (there are already two copies of 1 in the system) can be distributed such that 4 and 5 are placed on $S_1$ and 2 and 3 are placed on $S_3$. This way, $S_1$ and $S_2$ will store three document copies and $S_3$ will store four document copies. The redirection mechanism will now work as follows. Requests to document 1 will be redirected to $S_1$ with probability 0.3/0.35=0.86 and to $S_2$ with probability 0.05/0.35=0.14. All requests to documents 2 and 3 will be redirected to $S_2$ and all requests to documents 4 and 5 will be redirected to $S_3$. This redirection mechanism is illustrated in FIG. 2 by redirection probabilities assigned to the interconnections between the redirection server 14-1 and the document servers $S_1$, $S_2$ and $S_3$.

As another example, consider a homogeneous system with the same server configuration as in the example of FIG. 2 but with a value of k=2. Assume again that there are five documents 1, 2, . . . , 5 with the same access probabilities as above. Each document server $S_1$, $S_2$ and $S_3$ has a scaled capacity of 0.333. In the first phase, the round-robin technique orders the document copies in ascending order of their access probabilities, to produce an order of $4^1$, $4^2$, $3^1$, $3^2$, $5^1$, $5^2$, $1^1$, $1^2$, $2^1$, $2^2$. Note that in this example the access probability of a document will be equally split between the copies of the document for local balance. In the first round, documents $4^1$, $4^2$, $3^1$ are placed on document servers $S_1$, $S_2$ and $S_3$ respectively. The cumulative probabilities after the first round are $CP_1^1=0.02$, $CP_2^1=0.02$ and $CP_3^1=0.025$. In the second round, documents $3^2$, $5^1$ and $5^2$ are placed on document servers $S_1$, $S_2$ and $S_3$, respectively. Now, the cumlative probabilities become $CP_1^2=0.045$, $CP_2^2=0.05$ and $CP_3^2=0.055$. In the third round, documents $1^1$, $1^2$ and $2^1$ are placed on document servers $S_1$, $S_2$ and $S_3$, respectively. Then, $CP_1^3=0.220$, $CP_2^3=0.225$ and $CP_3^3=0.305$. In the fourth round, document $2^2$ is first placed on document server $S_1$. Server $S_1$ is exhausted after 0.113 access probability of $2^2$ is mapped to it. This concludes the first phase. In the second phase, which uses the binning algorithm, $2^2$ is replicated on $S_2$ and 0.108 of the remaining access probability of $2^2$ (which is 0.137 at this point) is mapped to $S_2$. This exhausts $S_2$. Document $2^2$ is again replicated on $S_3$ and the remaining access probability of 0.029 is mapped to $S_3$. This exhausts both $2^2$ and $S_3$. Note that at this point, $S_3$ already contained $2^1$. This copy is merged with the copy of $2^2$ and their access probabilities are combined (0.25+0.029=0.279).

After the above-described distribution, server $S_1$ contains copies of documents 1,2,3 and 4, server $S_2$ contains copies of documents 1,2,4 and 5 and server $S_3$ contains copies of documents 2,3 and 5. It should be noted that there is one redundant copy of document 2. Although copies of document 2 are merged in server $S_3$, still there are at least two copies of 2 in the system. The redirection mechanism will use the probabilities shown in TABLE 1 to redirect requests to the different copies. TABLE 1 is organized such that an entry for row $S_1$ and column one in the table indicates the probability with which the request for document 1 will be directed to server $S_1$.

TABLE 1

Figure 3:
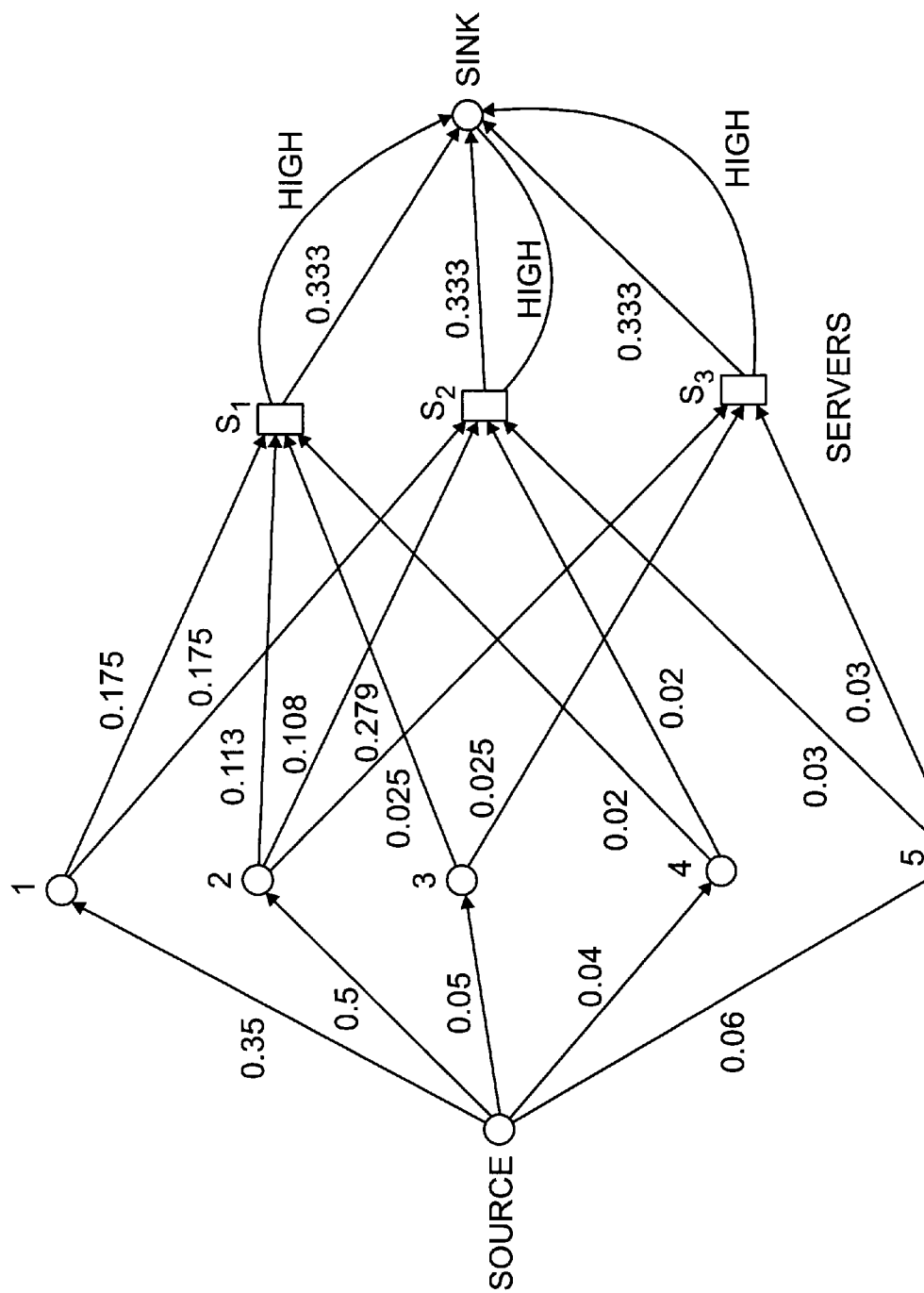
FIGS. 3, 4, 5 and 6 show flow network diagrams of examples illustrating the operation of the web server system of FIG. 1.

Redirection Probabilities for Example of FIG. 3

| | Document 1 | Document 2 | Document 3 | Document 4 | Document 5 |
|---|---|---|---|---|---|
| $S_1$ | 0.5 | 0.113/0.5 = 0.226 | 0.5 | 0.5 | |
| $S_2$ | 0.5 | 0.108/0.5 = 0.216 | | 0.5 | 0.5 |
| $S_3$ | | 0.279/0.5 = 0.558 | 0.5 | | 0.5 |

The load balance that is achieved through initial distribution of the documents may be disturbed during the operation of the server cluster due to the following changes: (1) a server failure; (2) changes in the access probabilities of the documents, i.e., some documents which were initially "hot" could become "cold" and vice-versa, and (3) changes in the capacity of the document servers. In the case of dedicated web servers, the first and second changes are generally more likely than the third. In the event any of these changes occur, it is desirable to be able to rebalance the server loads without any major reconfiguration of the system. More specifically, the rebalancing should be accomplished without redistributing documents among the servers, since this would generally involve overhead in moving the documents between servers and may affect the availability of the system. It is preferable to instead achieve rebalance by adjusting only the redirection probabilities used by the redirection server. As will be shown below, this rebalancing can be characterized as a network flow problem. It should be noted that the network flow approach is suitable for use in situations in which documents on a failed server are replicated and therefore available on another server or servers. In situations in which the documents on the failed server are not replicated, the above-described binning algorithm may be used to redistribute the documents from the failed server to achieve rebalance with a minimal amount of document movement.

FIG. 3 shows a flow network diagram characterizing the initial document distribution in the above-described two-phase example with k=2. The flow network is of a type described in, for example, R. K. Ahuja et. al., "Network Flows: Theory, Algorithms and Applications," Prentice Hall, 1993, which is incorporated by reference herein. The flow on the arcs from the documents to the servers show how the access probabilities of the different documents are mapped to the servers. The flows on the arcs from the servers to the sink, which are equal to the capacities as constrained by the initial distribution algorithm, show that the load is balanced. The costs on all the arcs except the ones marked "high" are equal to zero. The redundant arcs from the servers to the sink represent arcs that have infinite capacity but also have "high" cost. These are arcs through which no flow takes place at present but will be used for excess flow when a change occurs in the system. The document distribution represented in FIG. 3 is a maximum-flow minimum-cost solution to the corresponding flow network problem.

Figure 4:
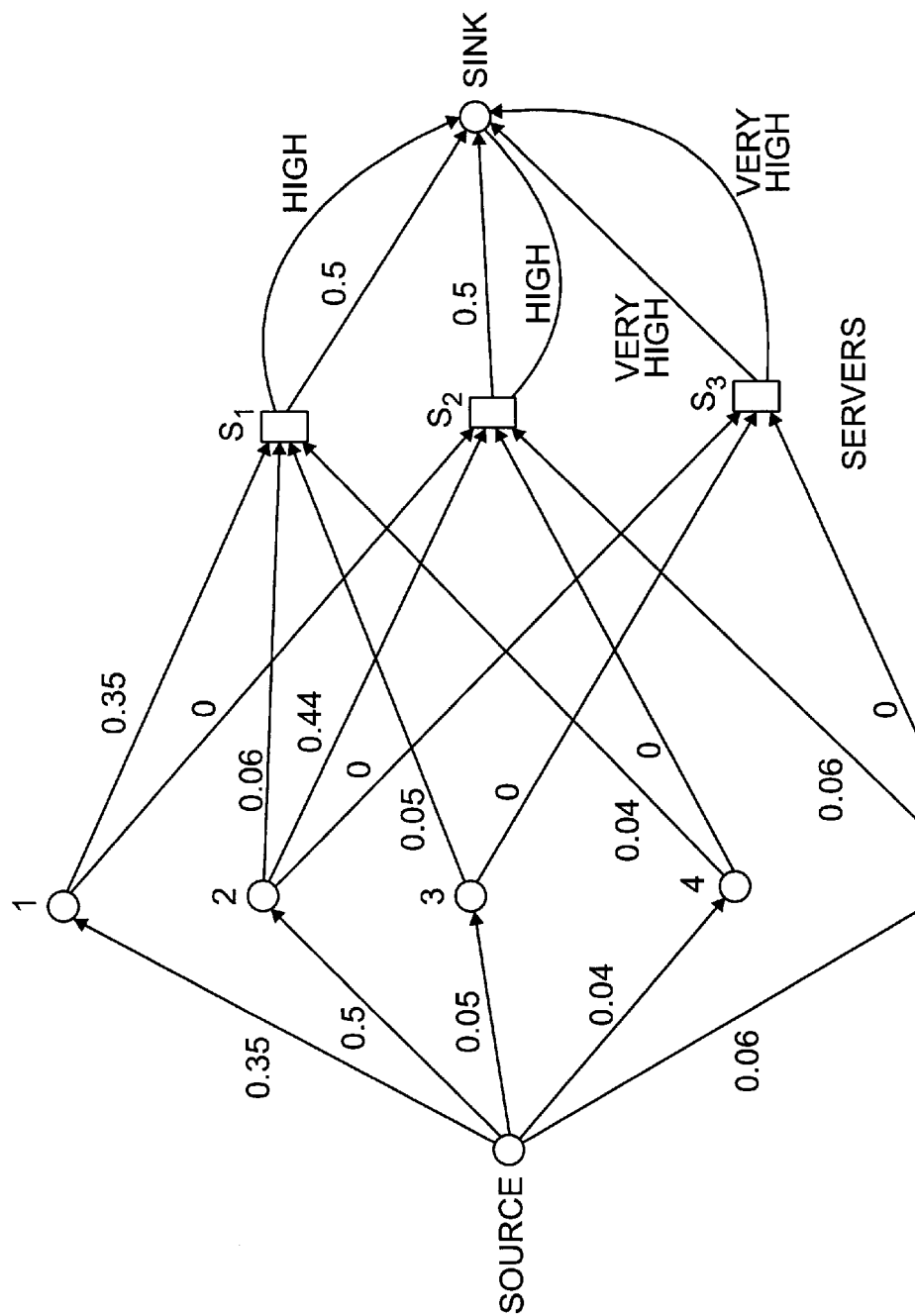

FIG. 4 is a flow network diagram illustrating a rebalancing in response to a server failure in the cluster system represented by the flow network diagram of FIG. 3. It will be assumed for this rebalancing example that server $S_3$ fails. The goal of the rebalancing process is to recompute the flows on the arcs between the documents and the servers from which the new redirection probabilities can be computed. Because $S_3$ has failed, there cannot be any flow redirected towards that server and hence the costs of the arcs from this server to the sink are made "very high" (i.e., >high)

as shown in FIG. 4. To achieve load balance, the capacities of the remaining two servers are made 0.5 each. The resulting flow network problem is solved to find the maximum-flow minimum-cost solution. This solution may be obtained using the mathematical programming language AMPL as described in R. Fourer et. al., "AMPL: A Modeling Language For Mathematical Programming," The Scientific Press, 1993, which is incorporated by reference herein, in conjunction with a linear program solver such as MINOS.

As in the FIG. 3 diagram, all of the arcs except the ones marked "high" and "very high" have zero cost. Hence, as much flow as possible is pushed through those arcs from the servers to the sink that have capacities 0.5. If the flow cannot be made equal to the capacity on this arc (e.g., from $S_2$ to the sink), only then there will be excess flow on the "high" capacity arcs (in this case, from $S_l$ to the sink). Of course, there will be no flow on the arcs with "very high" cost. The solution to this flow network problem will provide the flows on the arcs between the documents and the servers.

Note that the flow on all the arcs coming into $S_3$ will evaluate to zero. It is possible that there does not exist a solution that provides exact load balance. In that case, the solution obtained may alternatively provide the load balance property that the sum of the variation in the load on all the servers is minimized. This property may be provided by the network flow algorithm used and is referred to herein as "approximate" load balance. Requiring that documents not be redistributed after a server failure may limit the achievable load balance to "approximate" load balance in certain applications.

A solution obtained for the FIG. 4 flow network problem using the above-noted AMPL language and the MINOS linear program solver is shown as flows on the arcs between the documents and the servers in FIG. 4. The solution shown provides exact load balance in this example, although it should be noted that the local balance property for the document copies are no longer satisfied. The new redirection probabilities for the rebalancing are shown in TABLE 2 below.

TABLE 2

Redirection Probabilities for Rebalancing Example of FIG. 4

| | Document 1 | Document 2 | Document 3 | Document 4 | Document 5 |
|---|---|---|---|---|---|
| $S_1$ | 1 | 0.06/0.5 = 0.12 | 1 | 1 | |
| $S_2$ | 0 | 0.44/0.5 = 0.88 | | 0 | 1 |

Figure 5:
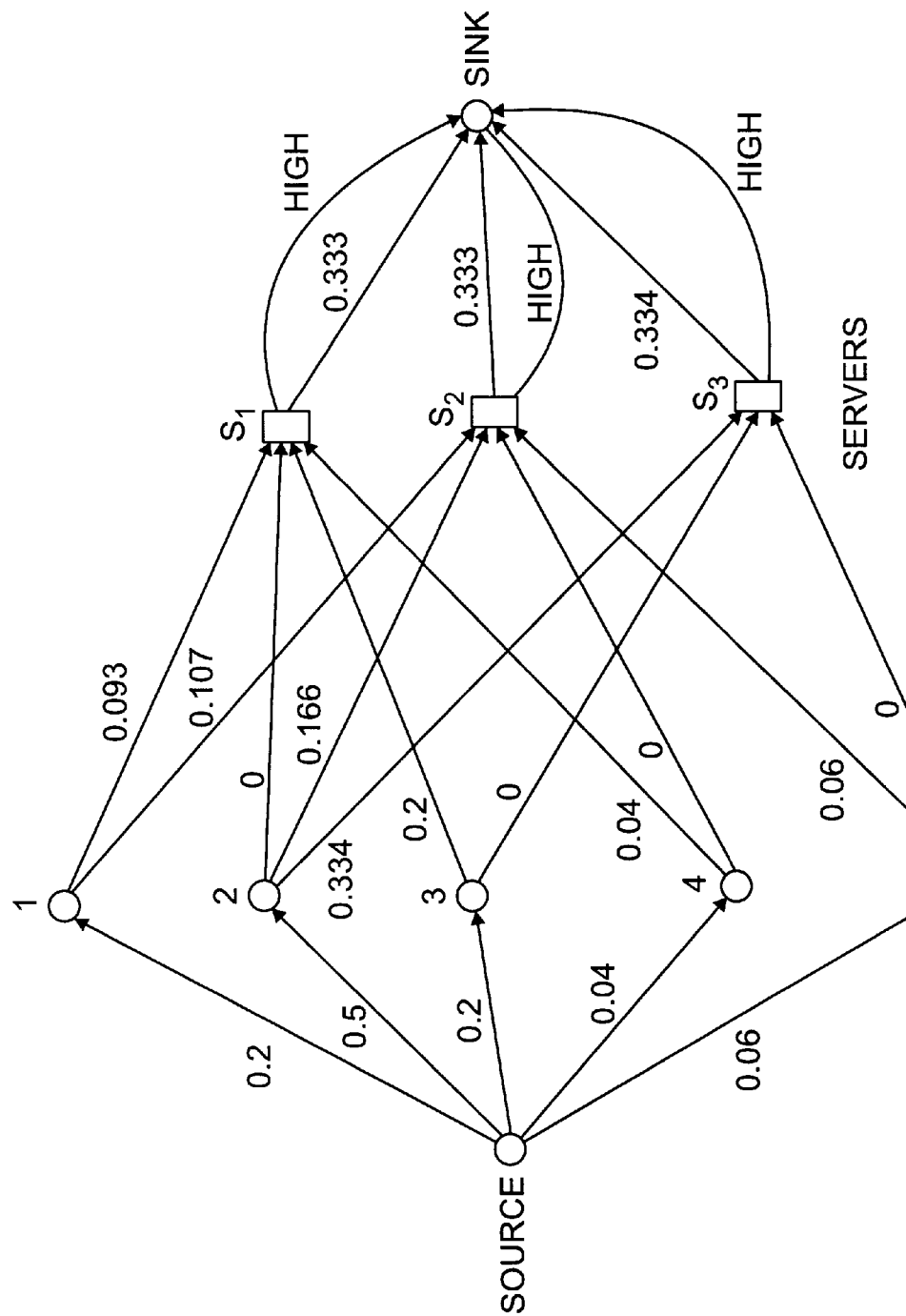

If the access rates of some of the documents change, new redirection probabilities can again be computed by formulating the problem as a maximum-flow minimum-cost problem. Consider the original configuration described in conjunction with FIG. 3 and assume that the access probabilities of documents 1 and 3 are changed as shown in the flow network of FIG. 5. If this flow network is solved for maximum flow with minimum cost, the solution will provide the flow on the arcs between the documents and the servers from which the new redirection probabilities can be computed. The solution is shown in FIG. 5 and it can be seen that this solution achieves exact load balance. The new redirection probabilities are shown in TABLE 3 below.

TABLE 3

New Redirection Probabilities for Example of FIG. 5

| | Document 1 | Document 2 | Document 3 | Document 4 | Document 5 |
|---|---|---|---|---|---|
| $S_1$ | 0.093/0.2 = 0.465 | 0 | 1 | 1 | |
| $S_2$ | 0.107/0.2 = 0.535 | 0.166/0.5 = .332 | | 0 | 1 |
| $S_3$ | | 0.334/0.5 = .668 | 0 | | 0 |

Figure 6:
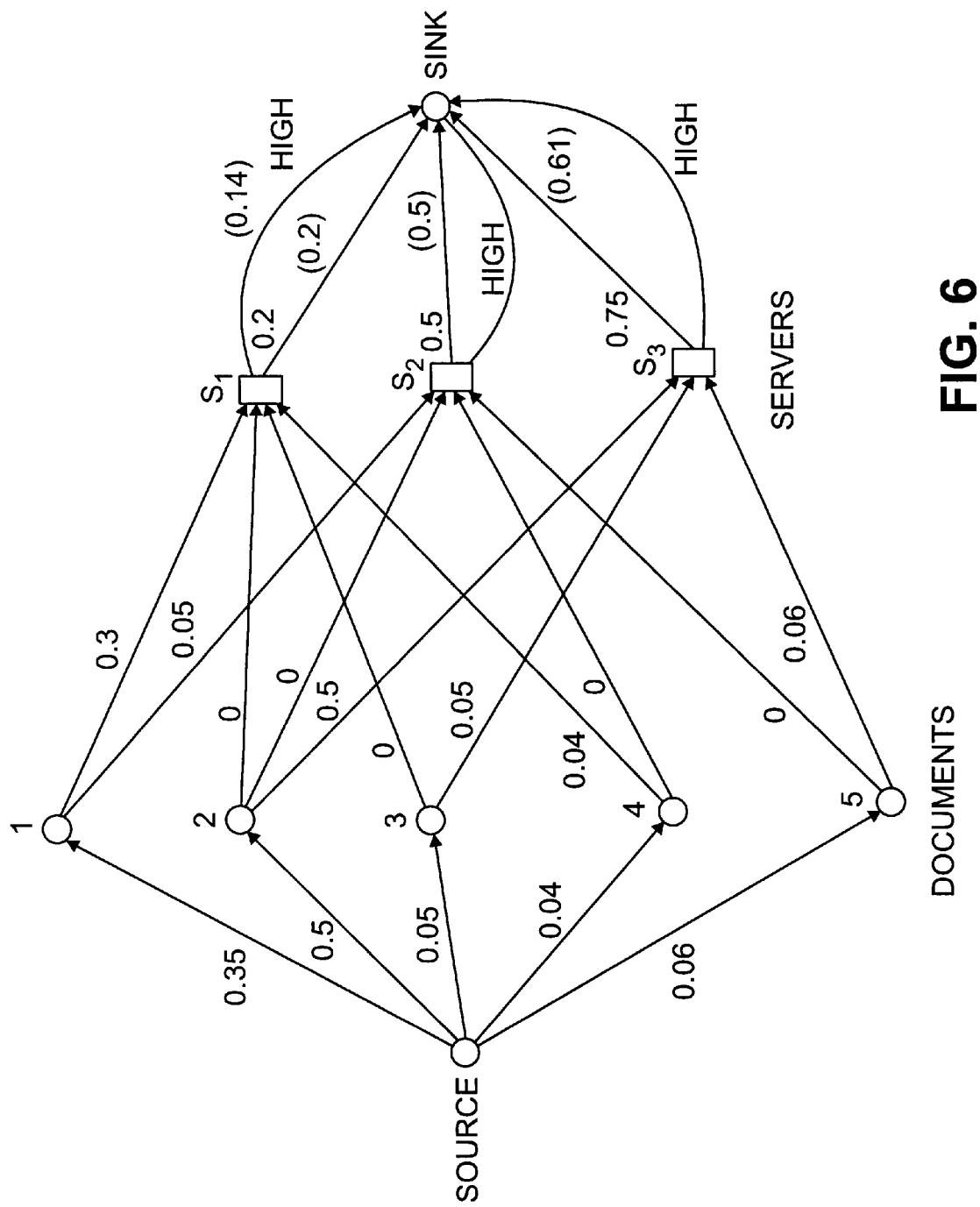

FIG. 6 shows a flow diagram for another example in which the capacities of the servers $S_1$, $S_2$ and $S_3$ have been changed to be 0.2, 0.05 and 0.75 respectively. The changes in the capacities are seen on the arcs from the servers to the sink. Again, a maximum-flow minimum-cost solution will provide the flow on the arcs from the documents to the servers from which new redirection probabilities can be calculated. The solution for this example is shown on the document-server arcs in FIG. 6. On the arcs between servers and sink, the flow obtained is shown in parenthesis. Unlike the previous two examples, in this case the solution is able to achieve only "approximate" load balance. The flow from server $S_3$ to the sink, which specifies the load on $S_3$, is 0.61, which is 0.14 less than its capacity. This load has been diverted to $S_1$ as extra load as shown on the redundant arc between $S_1$ and the sink. Thus, the load on $S_1$ is now 0.34. The new redirection probabilities are shown in TABLE 4 below.

TABLE 4

New Redirection Probabilities for Example of FIG. 6

| | Document 1 | Document 2 | Document 3 | Document 4 | Document 5 |
|---|---|---|---|---|---|
| $S_1$ | 0.3/0.35 = 0.857 | 0 | 0 | 1 | |
| $S_2$ | 0.05/0.35 = 0.143 | 0 | | 0 | 0 |
| $S_3$ | | 1 | 1 | | 1 |

As described above, the present invention utilizes a redirection mechanism for achieving load balance among a cluster of document servers. The redirection mechanism in the illustrative embodiments is an integral part of the HTTP protocol and is supported by all browsers and web servers. Alternative embodiments of the invention may utilize a redirection mechanism implemented at a higher level, such as redirection at the router level based on Internet Protocol (IP) addresses. In an HTTP redirection embodiment, if a client request received at a redirection server is to be redirected to another server, the original redirection server sends a redirection message to the client. The redirection message typically contains the URL or other identifier of the new server. The client then makes a separate request to the new server. The mapping which dictates that a URL should be redirected to another server may be located in the configuration file, which can be identified by a .conf suffix. Since a document may be replicated on more than one server, an incoming request for the document can be mapped to any of the servers on which the document exists. In the system 10 of FIG. 1, a request for a document is directed by the redirection server 14-1 or 14-2 to one of the document servers in server cluster 16 with a predetermined probability. This probability is determined by the document distribution algorithm described above. A configuration file htd.conf may specify the mapping of a URL to multiple URLs. For a given URL, each document server which is capable of serving the document associated with the URL, has a probability associated with it. This probability can be specified along with the document mapping in the configuration file. For example, for a URL given by /user1 the entry in htd.conf may be given by:

```
Redirect /user1
    [0.4] http://srv1.lucent.com/user1
    [0.2] http://srv2.lucent.com/user1
    [0.4] http://srv3.lucent.com/user1
```

When a redirection server is initialized, it stores the above information in table form in its internal data structures. When a request for a document in directory /user1 is received in the redirection server, the redirection server performs a look-up into its internal table to check where the request should be directed. In this example, the document servers srv1, srv2 and srv3 possess the replicated directory /user1 and the above entry in htd.conf specifies that the redirection server should redirect any request for /user1 to srv1 and srv3 with a probability of 0.4 each, and to srv2 with a probability of 0.2. Using these probabilities, the redirection server chooses one document server and sends a redirect message with the relevant URL to the client, which then connects directly to the document server using this URL. In order to accommodate requests which come to the document servers directly, e.g., all the relative URLs inside a document server URL, the document servers may also have a configuration file. However, the configuration file at the document server may be slightly modified to prevent further redirection of requests which have to be served by that server. Therefore, for directories and files which exist on a document server, e.g., srv1, the entry in the configuration file either does not exist or points to a directory in srv1.

The document distribution process may be implemented as follows. First, given the degree of replication, the access rates and sizes for different documents in the server system, run the initial distribution algorithm to generate the mapping of documents to servers and the corresponding probability numbers. Second, create a new configuration file for the redirection server and also for each document server. Third, use the UNIX rdist function to update the documents and the configuration files in the document servers. Finally, using the special primitive in rdist, restart the servers with the new configuration files. The UNIX rdist facility is software tool for copying and synchronizing files remotely. It takes actions specified in a file called distfile which is similar to a Makefile. For example, after the document distribution has been determined, the distfile given below may be used to update the document server srv1:

```
WEBSERVERS = (srv1)
WEBDIR = (/WWW/srv1)
DEST = (/WWW)
default:
    ${WEBDIR} ->${WEBSERVERS}
    install -w -R {DEST}
    special /WWW/srv1/htd.conf "kill -HUP 'cat/WWW/logs/httpd.pid'"
```

When rdist is run on the redirection server with the above distfile, it updates the directory /WWW contained on srv1, by copying the contents of the directory /WWW/srv1 contained locally on the redirection server. The special primitive in rdist allows an action to be performed once a file with a given name has been copied. Therefore, this primitive can be used to send a "hangup" signal to a redirection server once the configuration file with the new redirection probabilities has been generated. The signal handler in the redirection server reads the new configuration file, reinitializes its internal data structures and starts processing requests with the updated redirection probabilities.

Many conventional servers are equipped to gather information about the accesses to the server. This information is typically logged in a log file. For each access to a server, information like the IP address of the client, number of bytes sent back, time to process the request, response code and the time at which the request was made, can be logged into the log file. The log file can be post-processed to determine the access rates to the various documents in the server. Since the above-described embodiments of the invention use a probabilistic approach to distributing documents on the document servers, instantaneous load balancing is generally not performed. Instead, the average access rate for each server is equalized over a relatively long period of time, which may be on the order of a few hours to a day. As the average access rates vary, in order to keep the load balanced, the redirection probabilities can be recomputed periodically and the techniques described above used to communicate this change to the redirection server and the document servers. The redirection probabilities may be recomputed based on access data for a specific amount of time, such as the previous hour. Alternatively, the access data may be gathered in conjunction with a "sliding window" based on server access log information. For example, new access probabilities could be computed every 15 minutes based on logged data from the previous hour. The sliding window approach may be better able to smooth out dynamic access rate changes in certain applications.

A fault tolerant server system in accordance with the invention provides replication of documents on a cluster of servers and guarantees load-balanced access to the documents even in the presence of server failures. The redirection-based load balancing of the present invention may be implemented in systems other than those in the exemplary embodiments described above. For example, the load balancing of the invention could be applied to a system in which document servers are geographically distributed, as described in, for example, J. Gwertzman and M. Seltzer, "An Analysis of Geographical Push-Caching," HotOS '95, 1995. These and numerous other alternative embodiments within the scope of the following claims will be readily apparent to those skilled in the art.

What is claimed is:

1. A method of processing client requests received in a server system over a communication network, the method comprising the steps of:

determining a distribution of a set of documents over a plurality of servers based at least in part on access rates of at least a subset of the documents;

computing a set of redirection probabilities based on the distribution;

routing a client request to a redirection server; and redirecting the client request from the redirection server to one of the plurality of document servers based on the set of redirection probabilities.

2. The method of claim 1 wherein at least one of the document servers is an HTTP server.

3. The method of claim 1 wherein each of the document servers provides access to only a subset of a given set of documents available in the server system.

4. The method of claim 3 wherein the subset of documents for a given document server are available locally on that document server.

5. The method of claim 3 wherein the subset of documents for a given document server are available to that server over a local area network.

6. The method of claim 3 wherein the redirection server redirects a request for a given document to one of the document servers only if a copy of the given document is available to that document server.

7. The method of claim 1 wherein the documents are permitted to be replicated, such that more than one document server may be a candidate for servicing a given client request.

8. The method of claim 1 further including the step of determining the redirection probabilities and an initial distribution of the set of documents across the plurality of document servers using a load distribution algorithm.

9. The method of claim 8 wherein the load distribution algorithm ensures that at least a specified number k of replicas of each document are present in the system after the initial document distribution is complete.

10. The method of claim 8 wherein the system includes N document servers and the load distribution algorithm ensures that no more than N−1 redundant replicas of documents are present in the system after the initial document distribution is complete.

11. The method of claim 8 wherein the load distribution algorithm uses a load balancing metric to distribute the documents across the document servers such that request load is balanced across the document servers.

12. The method of claim 11 wherein the load balancing metric is the access rates of the documents.

13. The method of claim 12 wherein the load distribution algorithm attempts to equalize the sum of the access rates of all the documents accessible to a given document server across all of the document servers.

14. The method of claim 11 wherein the load balancing metric is scaled access rates of the documents, wherein one of the scaled access rates is obtained for a given document by multiplying an access rate for that document by the size of that document.

15. The method of claim 12 wherein if $\lambda$ is the rate at which client requests are received in the redirection server, the load distribution algorithm distributes the documents across N document servers such that the rate of requests redirected to each server is approximately $\lambda/N$.

16. The method of claim 8 wherein the load distribution algorithm includes the steps of:
randomly selecting a document and one of the document servers;
mapping an access rate of the selected document to the selected server; and
if the selected server has additional capacity, randomly selecting another document and mapping it to the selected server.

17. The method of claim 16 wherein the load distribution algorithm includes the steps of:
mapping a portion of an access rate of a randomly-selected document to the selected server; and
if the selected server has insufficient capacity to accommodate the entire access rate of the randomly-selected document, selecting another document server at random, and mapping a remaining portion of the access rate of the randomly-selected document to the other randomly-selected document server.

18. The method of claim 17 wherein the selecting and mapping steps are repeated until the entire access rates of all of the documents have been mapped to document servers.

19. The method of claim 8 wherein the load distribution algorithm is a two-phase algorithm including a first phase and a second phase, and the first phase includes the step of distributing documents to the document servers in accordance with a round robin technique, and further wherein the first phase ends when any server exceeds its access rate capacity.

20. The method of claim 19 wherein the second phase of the two-phase algorithm distributes document copies to a document server until a cumulative maximum access rate is reached for that server, and then distributes document copies to another document server, and wherein replication of a given document copy takes place when a given document server exceeds its capacity when the given document copy is distributed to the given server.

21. The method of claim 1 further including the step of recomputing the set of redirection probabilities after a change in conditions associated with the server system.

22. The method of claim 21 wherein the change in conditions includes at least one of a failure of one or more of the document servers, a change in access rate for one or more documents, or a change in capacity of one of the document servers.

23. The method of claim 22 wherein the recomputing step is based on a maximum-flow minimum-cost solution of a network flow problem.

24. The method of claim 1 further including the step of utilizing a binning algorithm to redistribute documents from a failed one of the document servers to the remaining document servers.

25. A server system for processing client requests received over a communication network, the system comprising:
a plurality of document servers, wherein a distribution of a set of documents over the plurality of document servers is determined based at least in part on access rates of at least a subset of the documents; and
at least one redirection server for receiving a client request and for redirecting the client request to one of the plurality of document servers based on a set of redirection probabilities computed from the distribution.

26. The apparatus of claim 25 wherein at least one of the document servers is an HTTP server.

27. The apparatus of claim 25 wherein each of the document servers provides access to only a subset of a given set of documents available in the server system.

28. The apparatus of claim 27 wherein the subset of documents for a given document server are available locally on that document server.

29. The apparatus of claim 27 wherein the subset of documents for a given document server are available to that server over a local area network.

30. The apparatus of claim 27 wherein the redirection server redirects a request for a given document to one of the document servers only if a copy of the given document is available to that document server.

31. The apparatus of claim 25 wherein the documents are permitted to be replicated, such that more than one document server may be a candidate for servicing a given client request.

32. The apparatus of claim 25 wherein the redirection probabilities are determined and the set of documents are distributed across the plurality of document servers in accordance with a load distribution algorithm.

33. The apparatus of claim 32 wherein the load distribution algorithm ensures that at least a specified number k of replicas of each document are present in the system after an initial document distribution is complete.

34. The apparatus of claim 32 wherein the system includes N document servers and the load distribution algorithm ensures that no more than N−1 redundant replicas of documents are present in the system after the initial document distribution is complete.

35. The apparatus of claim 32 wherein the load distribution algorithm uses a load balancing metric to distribute the documents across the document servers such that request load is balanced across the document servers.

36. The apparatus of claim 35 wherein the load balancing metric is the access rates of the documents.

37. The apparatus of claim 35 wherein the load balancing metric is scaled access rates of the documents, wherein one of the scaled access rates is obtained for a given document by multiplying an access rate for that document by the size of that document.

38. The apparatus of claim 36 wherein the load distribution algorithm attempts to equalize the sum of the access rates of all the documents accessible to a given document server across all of the document servers.

39. The apparatus of claim 32 wherein if $\lambda$ is the rate at which client requests are received in the redirection server, the load distribution algorithm distributes the documents across N document servers such that the rate of requests redirected to each server is approximately $\lambda/N$.

40. The apparatus of claim 32 wherein the load distribution algorithm is a two-phase algorithm including a first phase and a second phase, and the first phase distributes documents to the document servers in accordance with a round robin technique, and further wherein the first phase ends when any server exceeds its access rate capacity.

41. The apparatus of claim 40 wherein the second phase of the two-phase algorithm distributes document copies to a document server until a cumulative maximum access rate is reached for that server, and then distributes document copies to another document server, and wherein replication of a given document copy takes place when a given document server exceeds its capacity when the given document copy is distributed to the given server.

42. The apparatus of claim 25 wherein the redirection probabilities are recomputed after a change in conditions associated with the server system.

43. The apparatus of claim 42 wherein the change in conditions includes at least one of a failure of one or more of the document servers, a change in access rate for one or more documents, or a change in capacity of one of the document servers.

44. An apparatus for processing client requests received in a server system over a communication network, the apparatus comprising:
    means for determining a distribution of a set of documents over a plurality of servers based at least in part on access rates of at least a subset of the documents;
    means for computing a set of redirection probabilities based on the distribution;
    means for routing a client request to a redirection server; and
    means for redirecting the client request from the redirection server to one of the plurality of document servers based on the set of redirection probabilities.

45. The apparatus of claim 44 wherein each of the document servers provides access to only a subset of a given set of documents available in the server system.

46. The apparatus of claim 44 wherein the redirection probabilities and an initial distribution of the set of documents across the plurality of document servers are determined using a load distribution algorithm.

47. The apparatus of claim 46 wherein the load distribution algorithm ensures that at least a specified number k of replicas of each document are present in the system after the initial document distribution is complete.

48. The apparatus of claim 46 wherein the system includes N document servers and the load distribution algorithm ensures that no more than N−1 redundant replicas of documents are present in the system after the initial document distribution is complete.

49. The apparatus of claim 46 wherein the load distribution algorithm uses a load balancing metric to distribute the documents across the document servers such that request load is balanced across the document servers.

50. The apparatus of claim 49 wherein the load balancing metric is the access rates of the documents.

51. The apparatus of claim 49 wherein the load balancing metric is scaled access rates of the documents, wherein one of the scaled access rates is obtained for a given document by multiplying an access rate for that document by the size of that document.

52. The apparatus of claim 44 wherein the set of redirection probabilities arc recomputed after a change in conditions associated with the server system.

53. The apparatus of claim 52 wherein the change in conditions includes at least one of a failure of one or more of the document servers, a change in access rate for one or more documents, or a change in capacity of one of the document servers.

54. An apparatus for processing client requests received in a server system over a communication network, the apparatus comprising:
    a memory for storing a set of redirection probabilities; and
    a processor operative to determine a distribution of a set of documents over a plurality of servers based at least in part on access rates of at least a subset of the documents; to compute the set of redirection probabilities based on the distribution; to receive a client request; and to redirect the client request to one of the plurality of document servers based on the set of redirection probabilities.

55. A method of processing client requests received in a server system over a communication network, the method comprising the steps of:
    determining a distribution of a set of documents over a plurality of servers of the server system based at least in part on access rates of at least a subset of the documents;
    computing a set of redirection probabilities based on the distribution;
    storing the set of redirection probabilities in a memory of the system;
    receiving a client request; and
    routing the client request to one of the plurality of document servers based on the set of redirection probabilities.

56. A method of processing client requests received in a server system over a communication network, the method comprising the steps of:
    determining a distribution of a set of documents over a plurality of document servers based at least in part on access rates of at least a subset of the documents;
    computing a set of redirection probabilities based on the distribution;
    utilizing the distribution to compute a set of redirection probabilities; and routing a client request to one of the plurality of document servers based on the set of redirection probabilities.

57. A method of processing client requests received in a server system over a communication network, the method comprising the steps of:

determining a distribution of a set of documents over a plurality of document servers of the server system based at least in part on access rates of at least a subset of the documents;

computing a set of redirection probabilities based on the distribution;

routing a client request from a redirection server of the server system to one of the plurality of document servers in the system based on the set of redirection probabilities; and recomputing the redirection probabilities after a change in conditions associated with the server system.

* * * * *